United States Patent [19]
Kitano et al.

[11] Patent Number: 5,886,109
[45] Date of Patent: Mar. 23, 1999

[54] AZO GROUP-CONTAINING HIGH MOLECULAR WEIGHT COMPOUND FOR BLOCK COPOLYMERIZATION

[75] Inventors: Hiromi Kitano, Toyama-ken; Kazuo Shiraki, Kawagoe; Yoshihisa Yamashita, Osaka, all of Japan

[73] Assignee: Wako Pure Chemical Industries, Ltd., Osaka, Japan

[21] Appl. No.: 847,509

[22] Filed: Apr. 24, 1997

[30] Foreign Application Priority Data

Apr. 30, 1996 [JP] Japan .................................... 8-132622
May 2, 1996 [JP] Japan .................................... 8-135733

[51] Int. Cl.$^6$ ............................ C08F 4/04; C08F 293/00
[52] U.S. Cl. ......................... 525/376; 525/383; 526/89; 526/200; 526/201; 526/202; 526/203; 526/218.1; 526/219; 534/573; 534/588
[58] Field of Search .................................... 534/573, 588; 526/89, 200, 201, 202, 203, 218.1, 219; 525/376, 383

[56] References Cited

U.S. PATENT DOCUMENTS 3,987,024 10/1976 MacLeay et al. .
5,558,966 9/1996 Kato et al. .................................. 430/96
5,612,406 3/1997 Frings et al. ............................. 524/533
5,744,559 4/1998 Nagai et al. ............................. 526/219

OTHER PUBLICATIONS

Ueda and Nagai, "Kagaku to Kogyo (Osaka)," 60, 57–65 (1986).
Ueda and Nagai "Kobunshi Ronbunshu", 44, 469–475 (1987).
American Chemical Society, 1991, vol. 24, ph–Responsive Liposomes Which Contain Amphiphiles Prepared by Using Lipophilic Radical Initiator, Hiromi Kitano, Yasumasa Akatsuka, and Norio Ise.
American Chemical Society, 1994, vol. 10, Sugar–Containing Lipids Prepared by Using a Lipophilic Radical Initator: Interfacial Recognition by Lectin As Studied by Using the Multiple Internal Reflection Fluorescence Method, Hiromi Kitano and Kohji Ohno.

*Primary Examiner*—Jeffrey Mullis
*Attorney, Agent, or Firm*—Oliff & Berridge, PLC

[57] ABSTRACT

An azo group-containing high molecular weight compound including —COHN—, an ester linkage, or an amido linkage and a monomer units of 10 to 1000 derived from α,β-ethylenically unsaturated monomer is effective for producing a block copolymer having two or more polymer segments different in structure by one-step reaction.

15 Claims, 1 Drawing Sheet

AZO GROUP-CONTAINING HIGH MOLECULAR WEIGHT COMPOUND FOR BLOCK COPOLYMERIZATION

BACKGROUND OF THE INVENTION

The present invention relates to an azo group-containing high-molecular weight compound.

Azo compounds have been widely used as a radical polymerization initiator for vinyl monomers.

The production of a block copolymer using a high-molecular weight azo compound has recently been proposed (for instance, Ueda and Nagai, "Kagaku to Kogyo (Osaka)", 60, 57 (1986)). Specifically, there has been proposed a process comprising carrying out first-stage polymerization under such conditions that a certain amount of azo groups are cleaved, by use of a linear high-molecular weight azo compound having a plurality of azo groups in the main chain which is obtained by alternating polycondensation of 4,4'-azobis(4-cyano-pentanoyl chloride) with a bifunctional compound such as hexamethylenediamine, for example, a compound represented by:

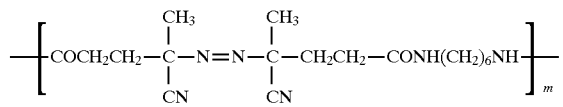

wherein m is a natural number, and carrying out second-stage and subsequent polymerizations by utilizing the remaining azo groups. It has already been reported that this process permits efficient production of a block copolymer comprising poly(methyl methacrylate) moieties and poly(n-butyl acrylate) moieties (for instance, Ueda and Nagai "Kobunshi Ronbunshu", 44, 469, (1987)).

Such block copolymers can be utilized for various special purposes but in some cases, only block copolymers having a specific structure (for example, MNM type polymers containing a polymer segment M and a polymer segment N in the case of thermoplastic elastomers) are useful. Therefore, there is eagerly desired a process for producing a block copolymer having a controlled structure.

The polymerization method using a high-molecular weight azo compound of the above formula involves the following problem. Since the azo groups present in the main chain are equal in cleavability, the initiation point of polymerization is tend to be random even though controllable to a certain extent by the reaction conditions and the like. Consequently, there are obtained block copolymers of various and many types such as a so-called MN type, MNM type, and $(MN)_n$ type. Thus, a block copolymer having a controlled structure cannot be efficiently obtained by a one-step reaction.

SUMMARY OF THE INVENTION

The present invention was made in view of such conditions and is intended to provide an azo group-containing high-molecular weight compound which permits production of a block copolymer having two or more kinds of polymer segments different in structure by a one-step reaction, and a copolymer obtained by use of said compound.

The present invention provides an azo group-containing high-molecular weight compound represented by the formula:

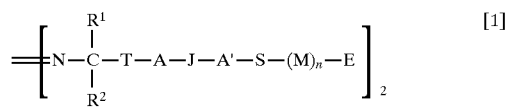

wherein one of $R^1$ and $R^2$ is a lower alkyl group while the other is a lower alkyl group or a cyano group; A is an alkylene group which may contain one or more oxygen atoms and/or an aromatic ring at the end or in the chain, or a direct link; A' is a divalent hydrocarbon group which may contain one or more oxygen atoms at the end or in the chain; M is a repeating unit derived from an α,β-ethylenically unsaturated monomer by polymerization using a polymerization initiator; E is an end group of the polymer obtained by polymerization of α,β-ethylenically unsaturated monomer; n is a natural number of 10 to 1,000; T is —CONH— or a direct link; and J is a direct link or an ester linkage in the case of T being —CONH—, and J is an ester linkage or an amido linkage in the case of T being a direct link.

The present invention also provides a polymerization initiator comprising said azo group-containing high-molecular weight compound.

The present invention further provides a process for polymerizing an α,β-ethylenically unsaturated monomer using said azo group-containing high-molecular weight compound.

The present invention still further provides a copolymer obtained by polymerizing an α,β-ethylenically unsaturated monomer by use of said azo group-containing high-molecular weight compound.

DESCRIPTION OF THE PREFERRED EMBODIMENTS

Figure 1:
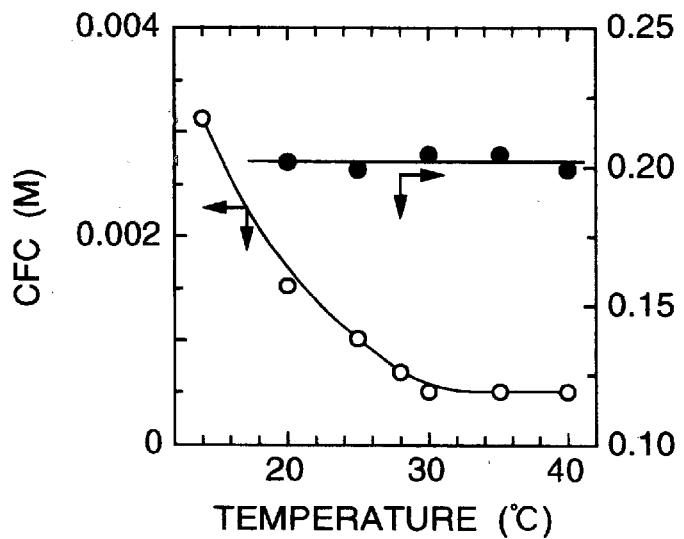
FIG. 1 shows curves showing critical flocculation concentrations (CFC) obtained in Experiment Example 2 by plotting critical flocculation concentration (M) on the axis of ordinate corresponding to individual measuring temperatures (° C.) on the axis of abscissa.

In order to obtain a compound which makes it possible to produce by a one-step reaction a block copolymer having two or more kinds of polymer segments different in structure which can be expected to be usable for various purposes, depending on its properties, the present inventors earnestly investigated and consequently found that this object can be achieved by polymerizing a compound having a reactive functional group at one end and a group capable of leaving a hydrogen atom more easily than said functional group, such as a mercapto group, at the other end and an α,β-ethylenically unsaturated monomer, and then reacting the polymerization product with any of various azo compounds. Thus, the present invention has been accomplished.

The azo group-containing high-molecular weight compound of the present invention is represented by the formula [1]:

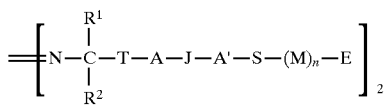

The lower alkyl group represented by each of $R^1$ and $R^2$ in the formula [1] may be either linear or branched and includes alkyl groups of preferably 1 to 6 carbon atoms. Specific examples of the lower alkyl group are a methyl group, an ethyl group, an n-propyl group, an isopropyl group, an n-butyl group, an isobutyl group, a t-butyl group, an s-butyl group, a pentyl group, an isopentyl group, a t-pentyl group, a 1-methyl-pentyl group, an n-hexyl group, an isohexyl group, etc.

The group represented by A, i.e., the alkylene group which may contain one or more oxygen atoms and/or an aromatic ring at the end or in the chain may be linear, branched or cyclic and includes lower alkylene groups of preferably 1 to 10 carbon atoms, more preferably 1 to 6 carbon atoms. As the alkylene group containing one or more oxygen atoms at the end or in the chain, there can be exemplified those having one or more, preferably 1 to 5, more preferably 1 to 3 —O— groups at an arbitrary position (s) at the end or in the chain. As the alkylene group containing an aromatic ring at the end or in the chain, there can be exemplified those having an aromatic ring such as a phenylene group, diphenylene group or the like at an arbitrary position at the end or in the chain. Specific examples of the alkylene group represented by A are a methylene group, an ethylene group, a propylene group, a butylene group, a 2-methylpropylene group, a pentylene group, a 2,2-dimethylpropylene group, a 2-ethylpropylene group, a hexylene group, a heptylene group, an octylene group, a nonylene group, a decylene group, a cyclohexylene group, a —CH$_2$—C$_6$H$_4$— group, an o-xylene-α,α'-diyl group, a —O—CH$_2$— group, a —O—CH$_2$CH$_2$— group, a —CH$_2$—O—CH$_2$— group, a —CH$_2$CH$_2$—O—CH$_2$— group, a —CH$_2$CH$_2$—O—CH$_2$CH$_2$— group, a —CH$_2$CH$_2$—O—CH$_2$CH$_2$—O—CH$_2$CH$_2$—O—CH$_2$CH$_2$— group, a —CH$_2$—O—C$_6$H$_4$— group, etc.

T is —CONH— or a direct link.

In the group represented by A', i.e., the divalent hydrocarbon group which may contain one or more oxygen atoms at the end or in the chain, the divalent hydrocarbon group includes, for example, alkylene groups and divalent aromatic groups. The alkylene groups may be linear, branched or cyclic and include lower alkylene groups of preferably 1 to 10 carbon atoms, more preferably 1 to 6 carbon atoms. Specific examples of the alkylene groups are a methylene group, an ethylene group, a propylene group, a butylene group, a 2-methyl-propylene group, a pentylene group, a 2,2-dimethyl-propylene group, a 2-ethylpropylene group, a hexylene group, a heptylene group, an octylene group, a nonylene group, a decylene group, a cyclohexylene group, etc. The divalent aromatic groups include, for instance, a phenylene group, a diphenylene group, an o-xylene-α,α'-diyl group, and a —CH$_2$—C$_6$H$_4$— group. As the divalent hydrocarbon group containing one or more oxygen atoms at the end or in the chain, there can be exemplified those having one or more, preferably 1 to 5, more preferably 1 to 3 —O— groups at an arbitrary position(s) at the end or in the chain. Typical examples of the divalent hydrocarbon group containing one or more oxygen atoms are —O—CH$_2$—, —O—CH$_2$CH$_2$—, —CH$_2$—O—CH$_2$—, —CH$_2$CH$_2$—O—CH$_2$—, —CH$_2$CH$_2$—O—CH$_2$CH$_2$—, —CH$_2$CH$_2$—O—CH$_2$CH$_2$—O—CH$_2$CH$_2$—, —O—C$_6$H$_4$—, —CH$_2$—O—C$_6$H$_4$—, etc.

As the repeating unit represented by M, i.e., the repeating unit derived from an αβ-ethylenically unsaturated monomer by polymerization, there can be exemplified monomer units represented by the formula:

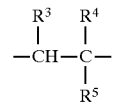

wherein $R^3$ is a hydrogen atom, a lower alkyl group, a carboxyl group, a carboxy-lower alkyl group, an alkoxycarbonyl group or a formyl group; $R^4$ is a hydrogen atom, a lower alkyl group, a carboxyl group or a halogen atom; and $R^5$ is a hydrogen atom, an alkyl group, a haloalkyl group, a substituted or unsubstituted aryl group, an aliphatic heterocyclic group, an aromatic heterocyclic group, a halogen atom, an alkoxycarbonyl group, a sugar-residue-containing alkoxycarbonyl group, a cyano group, a cyano-containing alkyl group, an acyloxy group, a carboxyl group, a carboxyalkyl group, a formyl group, an amino group, an aminoalkyl group, a carbamoyl group, an N-alkylcarbamoyl group or a hydroxyalkyl group. The repeating unit is not limited to the above-exemplified monomer units of the formula [4] and may be any repeating units obtained by polymerization of an αβ-ethylenically unsaturated monomer.

The lower alkyl group represented by each of $R^3$ and $R^4$ in the formula [4] may be either linear or branched and includes alkyl groups of preferably 1 to 6 carbon atoms. Specific examples of the lower alkyl group are a methyl group, an ethyl group, an n-propyl group, an isopropyl group, an n-butyl group, an isobutyl group, a t-butyl group, an s-butyl group, a pentyl group, an isopentyl group, a t-pentyl group, a 1-methyl-pentyl group, an n-hexyl group, an isohexyl group, etc.

As the carboxyl-lower alkyl group represented by $R^3$, there can be exemplified groups formed by the replacement of hydrogen atom of the above-exemplified lower alkyl group by a carboxyl group. Specific examples of the carboxy-lower alkyl group are a carboxymethyl group, a carboxyethyl group, a carboxypropyl group, a carboxybutyl group, a carboxypentyl group, a carboxyhexyl group, etc. As the alkoxycarbonyl group represented by $R^3$, there can be exemplified alkoxycarbonyl groups of preferably 2 to 20 carbon atoms, more preferably 2 to 7 carbon atoms. Specific examples of the alkoxycarbonyl group are a methoxycarbonyl group, an ethoxycarbonyl group, a propoxycarbonyl group, a butoxycarbonyl group, a pentyloxycarbonyl group, a hexyloxycarbonyl group, etc.

The halogen atom represented by each of $R^4$ and $R^5$ includes fluorine, chlorine, bromine, iodine, etc.

The alkyl group represented by $R^5$ may be linear, branched or cyclic and includes alkyl groups of preferably 1 to 20 carbon atoms. Specific examples of the alkyl group are a methyl group, an ethyl group, an n-propyl group, an isopropyl group, an n-butyl group, an isobutyl group, a t-butyl group, an s-butyl group, a pentyl group, an isopentyl group, a t-pentyl group, a 1-methylpentyl group, an n-hexyl group, an isohexyl group, a heptyl group, an octyl group, a nonyl group, a decyl group, an undecyl group, a dodecyl group, a hexadecyl group, an octadecyl group, a cyclopropyl group, a cyclopentyl group, a cyclohexyl group, etc. As the haloalkyl group represented by $R^5$, there can be exemplified haloalkyl groups of preferably 1 to 20 carbon atoms formed by halogenation (e.g. fluorination, chlorination, bromination or iodination) of the above-exemplified alkyl group. Specific examples of the haloalkyl group are a chloromethyl group, a bromomethyl group, a trifluoromethyl group, a 2-chloroethyl group, a 3-chloropropyl group, a 3-bromopropyl group, a 3,3,3-trifluoropropyl group, 2-perfluorooctylethyl group, a perfluorooctyl group, a l-chlorodecyl group, a 1-chlorooctadecyl group, etc. As the cyano-containing alkyl group represented by $R^5$, there can be exemplified groups formed by the replacement of hydrogen atom of the above-exemplified alkyl group by a cyano group. Specific examples of the cyano-containing alkyl group are a cyanomethyl group, a 2-cyanoethyl group, a 2-cyanopropyl group, a 3-cyanopropyl group, a 2-cyanobutyl group, a 4-cyanobutyl group, a cyanopentyl group, a cyanohexyl group, a cyanoheptyl group, a cyanooctyl group, a cyanononyl group, a cyanodecyl group, a cyanododecyl group, a cyanooctadecyl group, etc. As the carboxyalkyl group represented by $R^5$, there can be exemplified groups formed by the replacement of hydrogen atom of the above-exemplified alkyl group by a carboxyl group. Specific examples of the carboxyalkyl group are a carboxymethyl group, a carboxyethyl group, a carboxypropyl group, a carboxybutyl group, a carboxypentyl group, a carboxyhexyl group, a carboxyheptyl group, a carboxyoctyl group, a carboxynonyl group, a carboxydecyl group, a carboxydodecyl group, a carboxyoctadecyl group, etc. The aryl group of the substituted or unsubstituted aryl group represented by $R^5$ includes, for example, a phenyl group, a tolyl group, a xylyl group and a naphthyl group. The substituent on the aryl group includes, for instance, an amino group, a hydroxyl group and a carboxyl group. Specific examples of the substituted aryl group are an aminophenyl group, a toluidino group, a hydroxyphenyl group and a carboxyphenyl group. As the aliphatic heterocyclic group represented by $R^5$, 5- or 6-membered aliphatic heterocyclic groups, for example, are preferable and there can be exemplified those containing 1 to 3 hetero atoms selected from, for example, a nitrogen atom, an oxygen atom and a sulfur atom. Specific examples of the aliphatic heterocyclic group are a pyrrolidyl-2-one group, a piperidyl group, a piperidino group, a piperazinyl group, a morpholino group, etc. As the aromatic heterocyclic group represented by $R^5$, 5- or 6-membered aromatic heterocyclic groups, for example, are preferable and there can be exemplified those containing 1 to 3 hetero atoms selected from, for example, a nitrogen atom, a oxygen atom and a sulfur atom. Specific examples of the aromatic heterocyclic group are a pyridyl group, an imidazolyl group, a thiazolyl group, a furanyl group, a pyranyl group, etc. As the alkoxycarbonyl group represented by $R^5$, there can be exemplified alkoxycarbonyl groups of preferably 2 to 20 carbon atoms. Specific examples of the alkoxycarbonyl group are a methoxycarbonyl group, an ethoxycarbonyl group, a propoxycarbonyl group, a butoxycarbonyl group, a pentyloxycarbonyl group, a hexyloxycarbonyl group, a heptyloxy- carbonyl group, an octyloxycarbonyl group, a nonyloxycarbonyl group, a decyloxycarbonyl group, a dodecyloxycarbonyl group, an octadecyloxycarbonyl group, etc. As the sugar-residue-containing alkoxycarbonyl group represented by $R^5$, there can be exemplified groups formed by the replacement of hydrogen atom of the above-exemplified alkoxycarbonyl group by a sugar residue. The sugar residue is a residue formed by the release of a hydrogen atom from the hydroxyl group of a sugar. Specific examples of the sugar are monosaccharides such as glucose, galactose, fructose, glucosamine, galactosamine, gluconic acid, 1-thio-D-glucose, 5-thio-D-glucose, xylose, ribose, mannose, etc.; disaccharides such as maltose, lactose, cellobiose, sucrose, trehalose, etc.; and trisaccharides such as maltotriose, N,N',N"-triacetylchitotriose, etc. As the aminoalkyl group represented by $R^5$, there can be exemplified groups formed by the replacement of hydrogen atom of the above-exemplified alkyl group by an amino group. Specific examples of the aminoalkyl group are an aminomethyl group, an aminoethyl group, an aminopropyl group, an aminobutyl group, an aminopentyl group, an aminohexyl group, an aminoheptyl group, an aminooctyl group, an aminononyl group, an aminodecyl group, an aminododecyl group, an aminooctadecyl group, etc. As the N-alkylcarbamoyl group represented by $R^5$, there can be exemplified groups formed by the replacement of the hydrogen atom of a carbamoyl group by an alkyl group. Specific examples of the N alkylcarbamoyl group are an N-methylcarbamoyl group, an N-ethylcarbamoyl group, an N-n-propylcarbamoyl group, an N-isopropylcarbamoyl group, an N-n-butylcarbamoyl group, an N-t-butylcarbamoyl group, etc. As the hydroxyalkyl group represented by $R^5$, there can be exemplified groups formed by the replacement of a hydrogen atom of the above-exemplified alkyl group by a hydroxyl group. Specific examples of the hydroxyalkyl group are a hydroxymethyl group, a hydroxyethyl group, a hydroxypropyl group, a hydroxybutyl group, a hydroxypentyl group, a hydroxyhexyl group, a hydroxyheptyl group, a hydroxyoctyl group, a hydroxynonyl group, a hydroxydecyl group, a hydroxydodecyl group, a hydroxyoctadecyl group, etc. As the acyloxy group represented by $R^5$, there can be exemplified acyloxy groups of preferably 2 to 20 carbon atoms derived from carboxylic acids. Specific examples of the acyloxy group are an acetyloxy group, a propionyloxy group, a butyryloxy group, a pentanoyloxy group, a hexanoyloxy group, a heptanoyloxy group, an octanoyloxy group, a nonanoyloxy group, a decanoyloxy group, a benzoyloxy group, etc.

The polymer comprising the repeating units represented by M may be either a homopolymer or a copolymer.

Specific examples of the α,β-ethylenically unsaturated monomer capable of giving the repeating unit represented by M are alkenes of 2 to 20 carbon atoms, such as ethylene, propylene, butylene, isobutylene, etc.; α-olefin aromatic hydrocarbons of 8 to 20 carbon atoms, such as styrene, 4-methylstyrene, 4-ethylstyrene, divinylbenezene, etc.; vinyl esters of 3 to 20 carbon atoms, such as vinyl formate, vinyl acetate, vinyl propionate, isopropenyl acetate, etc.; halogen-containing vinyl compounds of 2 to 20 carbon atoms, such as vinyl chloride, vinylidene chloride, vinylidene fluoride, etc.; ethylenic carboxylic acids of 3 to 20 carbon atoms, such as acrylic acid, methacrylic acid, itaconic acid, maleic acid, fumaric acid, crotonic acid, vinylacetic acid, allylacetic acid, vinylbenzoic acid, etc. [these acids may be in the form of salts such as alkali metal salts (e.g. sodium salts, potassium salts, etc.), ammonium salts, etc.]; ethylenic carboxylic acid esters of 4 to 20 carbon atoms, such as methyl methacrylate, ethyl methacrylate, propyl methacrylate, butyl methacrylate, 2-ethylhexyl methacrylate, stearyl methacrylate, methyl acrylate, ethyl acrylate, butyl acrylate, 2-ethylhexyl acrylate, lauryl methacrylate, stearyl acrylate, methyl itaconate, ethyl itaconate, methyl maleate, ethyl maleate, methyl fumarate, ethyl fumarate, methyl crotonate, ethyl crotonate, methyl 3-butenoate, etc.; cyano-containing vinyl compounds of 3 to 20 carbon atoms, such as acrylonitrile, methacrylo-nitrile, allyl cyanide, etc.; vinylic amide compounds of 3 to 20 carbon atoms, such as acrylamide, methacryl-amide, etc.; ethylenic aldehydes of 3 to 20 carbon atoms, such as acrolein, crotonaldehyde, etc.; vinylsulfonic acids of 2 to 20 carbon atoms, such as vinylsulfonic acid, 4-vinylbenzenesulfonic acid, etc. [these acids may be in the form of salts such as alkali metal salts (e.g. sodium salts, potassium salts, etc.), etc.]; vinyl aliphatic amines of 2 to 20 carbon atoms, such as vinylamine, allylamine, etc.; vinyl aromatic amines of 8 to 20 carbon atoms, such as vinylaniline, etc.; vinyl aliphatic heterocyclic amines of 5 to 20 carbon atoms, such as N-vinylpyrrolidone, vinylpiperidine, etc.; vinyl aromatic heterocyclic amines of 5 to 20 carbon atoms, such as vinylpyridine, 1-vinylimidazole, etc.; ethylenic alcohols of 3 to 20 carbon atoms, such as allyl alcohol, crotyl alcohol, etc.; olefin phenols of 8 to 20 carbon atoms, such as 4-vinylphenol, etc.; and sugar-containing ethylenic carboxylic acid esters of 10 to 30 carbon atoms, such as 2-methacryloyloxyethyl-D-glucopyranoside, 2-acryloyloxy-ethyl-D-glucopyranoside, etc. These monomers may be used singly or in proper combination.

The symbol E represents an end group of the polymer obtained by polymerization of α,β-ethylenically unsaturated monomer. For example, each E is independently a group derived from the polymerization initiator used in the polymerization of α,β-ethylenically unsaturated monomer, a group derived from the α,β-ethylenically unsaturated monomer or a hydrogen atom. More in detail, when 2,2'-azobisisobutyronitrile is used as the polymerization initiator, E is represented by the formula:

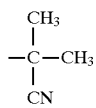

when dimethyl 2,2'-azobis(2-methyl propionate) is used as the polymerization initiator, E is represented by the formula;

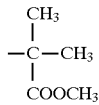

Whether E is the group derived from the polymerization initiator, or the group derived from the α,β-ethylenically unsaturated monomer or the hydrogen atom, or a mixture thereof (when two E's are different), or proportions of the mixture of groups and/or the hydrogen atom, depends on the amounts and kinds of the α,β-ethylenically unsaturated monomer, the polymerization initiator and a chain transfer agent used.

The symbol n denotes the degree of polymerization, and n is usually 10 to 1,000, preferably 10 to 100, more preferably 20 to 100.

The symbol J represents a direct link or an ester linkage in the case of T being —CONH—, and J represents an ester linkage or an amido linkage in the case of T being a direct link.

As the ester linkage represented by J, there can be exemplified —COO— and —OCO—. As the amido linkage, there can be exemplified —CONH—, i.e., an amido likage whose carbon atom is bonded to the carbon atom to which $R^1$ and $R^2$ are bonded in the formula [1], and —NHCO—,i.e., an amido likage whose nitrogen atom is bonded to the carbon atom to which $R^1$ and $R^2$ are bonded in the formula [1].

The azo group-containing high-molecular weight compound of the formula [1] of the present invention can be obtained, for example, by reacting a vinyl polymer of the formula:

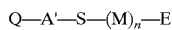     [2]

wherein A', M, E and n are as defined above; and Q is an amino group, a hydroxyl group or a carboxyl group, with an azo compound of the formula;

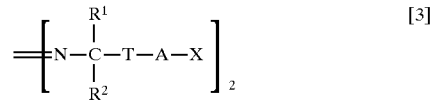

wherein $R^1$, $R^2$, T and A are as defined above; and X is an amino group, a hydroxyl group or a carboxyl group, provided that X should be a group reactive with the group represented by Q.

Here, the provision that X should be a group reactive with the group represented by Q means, for example, that X is an amino group or a hydroxyl group in the case of Q being a carboxyl group and that X is a carboxyl group in the case of Q being an amino group or a hydroxyl group.

For reacting the vinyl polymer of the formula [2] with the azo compound of the formula [3], there is a method of reacting the vinyl polymer of the formula [2] directly with the azo compound of the formula [3] by use of a dehydrating agent in a suitable solvent preferably in the presence of a basic substance. There is also the following method. For example, when X is a carboxyl group, this carboxyl group may be converted to an activated ester or an acid halide and then thus treated compound of formula [3] may be reacted with the compound of the formula [2] in a suitable solvent preferably in the presence of a basic substance. When Q is a carboxyl group, this carboxyl group may be converted to in the same manner as mentioned above and then the thus treated compound of the formula [2] may be reacted with the compound of the formula [3]. Although either of these methods may be employed, when X is a carboxylic group, the latter method, i.e., the method comprising the conversion to an activated ester or acid chloride is preferable in view of, for example, the influences of other functional groups in the molecule.

The dehydrating agent used in the direct reaction is not particularly limited so long as it is usable as a dehydrating-condensation agent. The dehydrating agent includes, for instance, inorganic dehydrating agents such as concentrated sulfuric acid, phosphorus pentoxide, anhydrous zinc chloride, etc.; carbodiimides such as dicyclohexylcarbodiimide, diisopropylcarbodiimide, 1-ethyl-3-(3-dimethylaminopropylcarbodiimide) hydrochloride, etc.; polyphosphoric acids; acetic anhydride; carbonyldiimidazole; and p-toluenesulfonyl chloride.

Although the amount of the dehydrating agent used is not particularly limited, it is properly chosen in the range of usually 1 to 5 moles, preferably 2 to 3 moles, per mole of the compound of the formula [3].

In both methods, as the basic substance, there can be used, for example, organic amines such as triethylamine, N,N-dimethylaniline, piperidine, pyridine, 4-dimethylaminopyridine, N-methylmorpholine, 1,5-diazabicyclo[4.3.0]non-5-ene, 1,8-diazabicyclo[5.4.0]-undec-7-ene, tri-n-butylamine, etc.; and alkaline metal compounds such as sodium hydride, n-butyllithium, etc.

The amount of the basic substance used is properly chosen in the range of usually 0.5 to 5 moles, preferably 0.5 to 2 moles, per mole of the compound of the formula [3] (or an active ester thereof) or the dehydrating agent.

In both methods, the solvent for reaction includes, for example, ethers such as diethyl ether, diisopropyl ether, tetrahydrofuran, 1,4-dioxane, dimethoxyethane, etc.; halogenated hydrocarbons such as carbon tetrachloride, chloroform, methylene chloride, dichloroethane, trichloroethane, etc.; hydrocarbons such as n-hexane, benzene, toluene, xylene, etc.; esters such as ethyl acetate, butyl acetate, methyl propionate, etc.; acetonitrile; and N,N-dimethylformamide. These solvents may be used singly or in proper combination.

The amount of the compound of the formula [2] (or an active ester thereof) is properly chosen in the range of usually 1.5 to 5 moles, preferably 1.8 to 3 moles, per mole of the compound of the formula [3] (or an active ester thereof).

Although not particularly limited, the reaction temperature is properly chosen in the range of usually −10° C. to 60° C. in both methods for the following reason: when the reaction temperature is too high, the azo group is cleaved, while when the reaction temperature is too low, the reaction rate is slow, resulting in a long production time. The reaction temperature may be raised stepwise from a lowl temperature.

The reaction time is properly chosen in the range of usually 1 to 60 hours.

It is sufficient that reaction operations other than the above-mentioned operations, after treatment and the like are carried out in the same manner as for a well-known similar reaction.

As a method for converting the carboxyl group to an active ester, there ban be exemplified a method of reacting the compound having the carboxyl group with, for example, a hydroxy compound by use of a dehydrating agent in a suitable solvent optionally in the presence of a basic substance.

The hydroxy compound includes, for instance, hydroxylamine derivatives such as N-hydroxysuccinimide, N-hydroxyphthalimide, N-hydroxypiperidine, etc.

The amount of the hydroxy compound used is properly chosen in the range of usually 0.8 to 2 moles, preferably 0.9 to 1.5 moles, per mole of the carboxyl group to be activated.

The compound of the formula [2] as a starting material for the compound of the formula [1] can be obtained, for example, by polymerizing an αβ-ethylenically unsaturated monomer in the presence of a compound of the formula:

Q—A'—SH  [5]

wherein Q and A' are as defined above, by use of a polymerization initiator in a suitable solvent or without a solvent preferably in an inert gas atmosphere.

The αβ-ethylenically unsaturated monomer is a monomer capable of giving a repeating unit represented by M on polymerization. Specific examples thereof are as given above.

The polymerization initiator includes, for example, azo compounds such as 2,2'-azobisisobutyronitrile, 2,2'-azobis (2,4-dimethylvaleronitrile), 2,2'-azobis(2-amidinopropane) dihydrochloride, dimethyl 2,2'-azobis(2-methylpropionate), 4,4'-azobis(4-cyanovaleric acid), etc.; peroxides such as benzoyl peroxide, di-t-butyl peroxide, etc.; and photopolymerization initiators such as benzoin ethyl ether, etc.

In the polymerization, a solvent may be used or not used when it does not affect the polymerization. The solvent includes, for example, hydrocarbons such as toluene, xylene, benzene, cyclohexane, n-hexane, n-octane, etc.; halogenated hydrocarbons such as dichloroethane, trichloroethylene, etc.; esters such as ethyl acetate, n-butyl acetate, methyl propionate, etc.; ketones such as acetone, ethyl methyl ketone, cyclohexanone, etc.; alcohols such as methanol, ethanol, n-propanol, isopropanol, n-butanol, isobutanol, t-butanol, etc.; N-methylpyrrolidone; N,N-dimethylacetamide; N,N-dimethylformamide; dimethyl sulfoxide; and water. These solvents may be used singly or in proper combination.

The polymerization is preferably carried out in an inert gas atmosphere. The inert gas includes, for example, nitrogen gas and argon gas.

Although the concentration of the αβ-ethylenically unsaturated monomer at the time of the polymerization is varied depending on the kind of the monomer, it is properly chosen in the range of usually 5 to 100% by weight (no solvent), preferably 10 to 60% by weight, based on the weight of the solvent for polymerization.

Although the amount of the polymerization initiator used is varied depending on the kind of the αβ-ethylenically unsaturated monomer, the polymerization conditions, etc., it is properly chosen in the range of usually 0.001 to 5% by weight, preferably 0.01 to 2% by weight, based on the weight of the monomer.

The amount of the compound of the formula [5] present together with the αβ-ethylenically unsaturated monomer in the polymerization is properly chosen in the range of usually 0.005 to 0.2 equivalent, preferably 0.01 to 0.1 equivalent, per equivalent of the αβ-ethylenically unsaturated monomer.

Although not particularly limited, the reaction temperature is properly chosen in the range of usually −10° C. to 70° C.

The reaction temperature may be raised stepwise from a low temperature.

The reaction time is properly chosen in the range of usually 1 to 60 hours.

It is sufficient that reaction operations other than the above-mentioned operations, after treatment and the like are carried out according to a conventional method.

Typical specific examples of the azo compound of the formula [3] are the following compounds, which are not intended in any way to limit the scope of the invention.

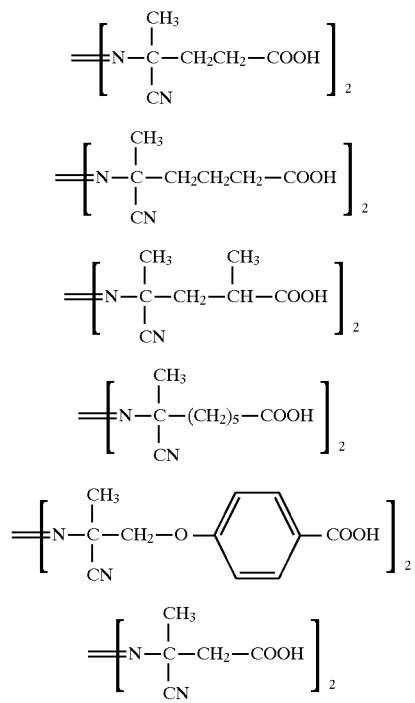

-continued

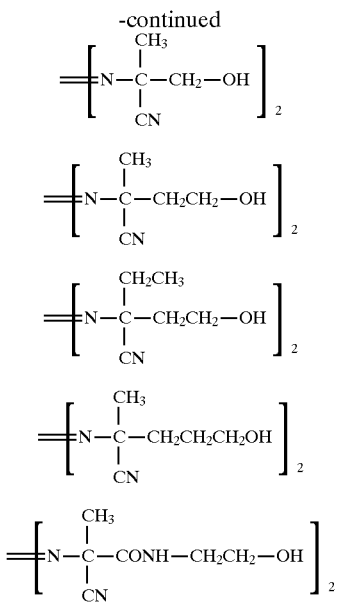

A typical example of reaction formula representing a process for producing the azo group-containing high-molecular weight compound of the present invention is the following reaction formula:

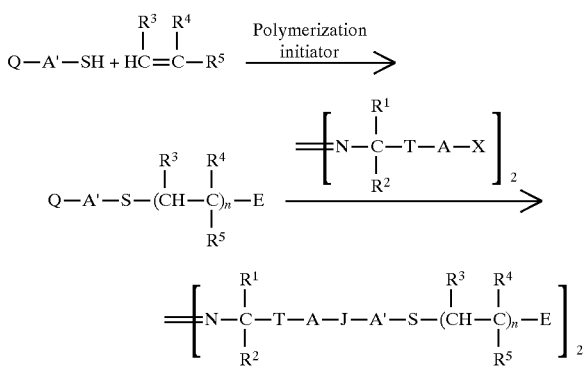

wherein A, A', T, $R^1$ through $R^5$, J, X, Q, E and n are as defined above.

When X or Q is a carboxyl group, the compounds having X or Q, respectively, may be reacted with each other after, if necessary, converting the carboxyl group to an activated ester or an acid halide as described above.

Since the azo group-containing high-molecular weight compound of the formula [1] of the present invention easily forms radical species with production of nitrogen gas by azo group cleavage on heating or light irradiation, polymerization proceeds rapidly when any of various polymerizable monomers is present together with the compound of the formula [1].

Consequently, a copolymer having segments formed from the polymerizable monomer and segments represented by (M)n can be obtained efficiently by a one-step reaction.

That is, the azo group-containing high-molecular weight compound of the formula [1] of the present invention serves both as a polymerization initiator in the polymerization and as a starting material for the copolymer to be obtained by the polymerization.

It is sufficient that the copolymer of the present invention is produced as follows.

The azo group-containing high-molecular weight compound of the formula [1] of the present invention and a suitable polymerizable monomer are polymerized in a suitable solvent or without a solvent preferably in an inert gas atmosphere.

This polymerization can be carried out by any of polymerization methods such as solution polymerization, bulk polymerization, suspension polymerization, emulsion polymerization, etc. In this case, an azo group-containing polysiloxane compound and a conventional radical polymerization initiator (e.g. 2,2'-azobisisobutyronitrile) may be simultaneously used.

As the polymerizable monomer, there can be used compounds represented by the formula:

wherein $R^6$ is a hydrogen atom, a lower alkyl group, a carboxyl group, a carboxy-lower alkyl group, an alkoxycarbonyl group or a formyl group; $R^7$ is a hydrogen atom, a lower alkyl group, a carboxyl group or a halogen atom; and $R^8$ is a hydrogen atom, an alkyl group, a haloalkyl group, a substituted or unsubstituted aryl group, an aliphatic heterocyclic group, an aromatic heterocyclic group, a halogen atom, an alkoxycarbonyl group, a sugar-residue-containing alkoxycarbonyl group, a cyano group, a cyano-containing alkyl group, an acyloxy group, a carboxyl group, a carboxyalkyl group, a formyl group, an amino group, an aminoalkyl group, a carbamoyl group, an N-alkylcarbamoyl group or a hydroxyalkyl group.

The lower alkyl group represented by each of $R^6$ and $R^7$ in the formula [6] may be either linear or branched and includes alkyl groups of preferably 1 to 6 carbon atoms. Specific examples of the lower alkyl group are a methyl group, an ethyl group, an n-propyl group, an isopropyl group, an n-butyl group, an isobutyl group, a t-butyl group, an s-butyl group, a pentyl group, an isopentyl group, a t-pentyl group, a 1-methyl-pentyl group, an n-hexyl group, an isohexyl group, etc.

As the carboxy-lower alkyl group represented by $R^6$, there can be exemplified groups formed by the replacement of hydrogen atom of the above-exemplified lower alkyl group by a carboxyl group. Specific examples of the carboxy-lower alkyl group are a carboxymethyl group, a carboxyethyl group, a carboxypropyl group, a carboxybutyl group, a carboxypentyl group, a carboxyhexyl group, etc. As the alkoxycarbonyl group represented by $R^6$, there can be exemplified alkoxycarbonyl groups of preferably 2 to 20 carbon atoms, more preferably 2 to 7 carbon atoms. Specific examples of the alkoxycarbonyl group are a methoxycarbonyl group, an ethoxycarbonyl group, a propoxycarbonyl group, a butoxycarbonyl group, a pentyloxycarbonyl group, a hexyloxycarbonyl group, etc.

The halogen atom represented by each of $R^7$ and $R^8$ includes fluorine, chlorine, bromine, iodine, etc.

The alkyl group represented by $R^8$ may be linear, branched or cyclic and includes alkyl groups of preferably 1 to 20 carbon atoms. Specific examples of the alkyl group are a methyl group, an ethyl group, an n-propyl group, an isopropyl group, an n-butyl group, an isobutyl group, a t-butyl group, an s-butyl group, a pentyl group, an isopentyl group, a t-pentyl group, a 1-methylpentyl group, an n-hexyl group, an isohexyl group, a heptyl group, an octyl group, a nonyl group, a decyl group, an undecyl group, a dodecyl group, a hexadecyl group, an octadecyl group, a cyclopropyl group, a cyclopentyl group, a cyclohexyl group, etc. As the haloalkyl group represented by $R^8$, there can be exemplified haloalkyl groups of preferably 1 to 20 carbon atoms formed by halogenation (e.g. fluorination, chlorination, bromination or iodination) of the above-exemplified alkyl group. Specific examples of the haloalkyl group are a chloromethyl group, a bromomethyl group, a trifluoromethyl group, a 2-chloroethyl group, a 3-chloropropyl group, a 3-bromopropyl group, a 3,3,3-trifluoropropyl group, 2-perfluorooctylethyl group, a perfluorooctyl group, a 1-chlorodecyl group, a 1-chlorooctadecyl group, etc. As the cyano-containing alkyl group represented by $R^8$, there can be exemplified groups formed by the replacement of hydrogen atom of the above-exemplified alkyl group by a cyano group. Specific examples of the cyano-containing alkyl group are a cyanomethyl group, a 2-cyanoethyl group, a 2-cyanopropyl group, a 3-cyanopropyl group, a 2-cyanobutyl group, a 4-cyanobutyl group, a cyanopentyl group, a cyanohexyl group, a cyanoheptyl group, a cyanooctyl group, a cyanononyl group, a cyanodecyl group, a cyanododecyl group, a cyanooctadecyl group, etc. As the carboxyalkyl group represented by $R^8$, there can be exemplified groups formed by the replacement of hydrogen atom of the above-exemplified alkyl group by a carboxyl group. Specific examples of the carboxyalkyl group are a carboxymethyl group, a carboxyethyl group, a carboxypropyl group, a carboxybutyl group, a carboxypentyl group, a carboxyhexyl group, a carboxyheptyl group, a carboxyoctyl group, a carboxynonyl group, a carboxydecyl group, a carboxydodecyl group, a carboxyoctadecyl group, etc. The aryl group of the substituted or unsubstituted aryl group represented by $R^8$ includes, for example, a phenyl group, a tolyl group, a xylyl group and a naphthyl group. The substituent on the aryl group includes, for instance, an amino group, a hydroxyl group and a carboxyl group. Specific examples of the substituted aryl group are an aminophenyl group, a toluidino group, a hydroxyphenyl group and a carboxyphenyl group. As the aliphatic heterocyclic group represented by $R^8$, 5- or 6-membered aliphatic heterocyclic groups, for example, are preferable and there can be exemplified those containing 1 to 3 hetero atoms selected from, for example, a nitrogen atom, an oxygen atom and a sulfur atom. Specific examples of the aliphatic heterocyclic group are a pyrrolidyl-2-one group, a piperidyl group, a piperidino group, a piperazinyl group, a morpholino group, etc. As the aromatic heterocyclic group represented by $R^8$, 5- or 6-membered aromatic heterocyclic groups, for example, are preferable and there can be exemplified those containing 1 to 3 hetero atoms selected from, for example, a nitrogen atom, a oxygen atom and a sulfur atom. Specific examples of the aromatic heterocyclic group are a pyridyl group, an imidazolyl group, a thiazolyl group, a furanyl group, a pyranyl group, etc. As the alkoxycarbonyl group represented by $R^8$, there can be exemplified alkoxycarbonyl groups of preferably 2 to 20 carbon atoms. Specific examples of the alkoxycarbonyl group are a methoxycarbonyl group, an ethoxycarbonyl group, a propoxycarbonyl group, a butoxycarbonyl group, a pentyloxycarbonyl group, a hexyloxycarbonyl group, a heptyloxy- carbonyl group; an octyloxycarbonyl group, a nonyloxycarbonyl group, a decyloxycarbonyl group, a dodecyloxycarbonyl group, an octadecyloxycarbonyl group, etc. As the sugar-residue-containing alkoxycarbonyl group represented by $R^8$, there can be exemplified groups formed by the replacement of hydrogen atom of the above-exemplified alkoxycarbonyl group by a sugar residue. The sugar residue is a residue formed by the release of a hydrogen atom from the hydroxyl group of a sugar. Specific examples of the sugar are monosaccharides such as glucose, galactose, fructose, glucosamine, galactosamine, gluconic acid, 1-thio-D-glucose, 5-thio-D-glucose, xylose, ribose, mannose, etc.; disaccharides such as maltose, lactose, cellobiose, sucrose, trehalose, etc.; and trisaccharides such as maltotriose, N,N',N"-triacetylchitotriose, etc. As the aminoalkyl group represented by $R^8$, there can be exemplified groups formed by the replacement of hydrogen atom of the above-exemplified alkyl group by an amino group. Specific examples of the aminoalkyl group are an aminomethyl group, an aminoethyl group, an aminopropyl group, an aminobutyl group, an aminopentyl group, an aminohexyl group, an aminoheptyl group, an aminooctyl group, an aminononyl group, an aminodecyl group, an aminododecyl group, an aminooctadecyl group, etc. As the N-alkylcarbamoyl group represented by $R^8$, there can be exemplified groups formed by the replacement of the hydrogen atom of a carbamoyl group by an alkyl group. Specific examples of the N-alkylcarbamoyl group are an N-methylcarbamoyl group, an N-ethylcarbamoyl group, an N-n-propylcarbamoyl group, an N-isopropylcarbamoyl group, an N-n-butylcarbamoyl group, an N-t-butylcarbamoyl group, etc. As the hydroxyalkyl group represented by $R^8$, there can be exemplified groups formed by the replacement of a hydrogen atom of the above-exemplified alkyl group by a hydroxyl group. Specific examples of the hydroxyalkyl group are a hydroxymethyl group, a hydroxyethyl group, a hydroxypropyl group, a hydroxybutyl group, a hydroxypentyl group, a hydroxyhexyl group, a hydroxyheptyl group, a hydroxyoctyl group, a hydroxynonyl group, a hydroxydecyl group, a hydroxydodecyl group, a hydroxyoctadecyl group, etc. As the acyloxy group represented by $R^8$, there can be exemplified acyloxy groups of preferably 2 to 20 carbon atoms derived from carboxylic acids. Specific examples of the acyloxy group are an acetyloxy group, a propionyloxy group, a butyryloxy group, a pentanoyloxy group, a hexanoyloxy group, a heptanoyloxy group, an octanoyloxy group, a nonanoyloxy group, a decanoyloxy group, a benzoyloxy group, etc.

Preferable examples of the polymerizable monomer of the formula [6] includes, for example, alkenes of 2 to 20 carbon atoms, such as ethylene, propylene, butylene, isobutylene, etc.; α-olefin aromatic hydrocarbons of 8 to 20 carbon atoms, such as styrene, 4-methylstyrene, 4-ethylstyrene, divinylbenezene, etc.; vinyl esters of 3 to 20 carbon atoms, such as vinyl formate, vinyl acetate, vinyl propionate, isopropenyl acetate, etc.; halogen-containing vinyl compounds of 2 to 20 carbon atoms, such as vinyl chloride, vinylidene chloride, vinylidene fluoride, etc.; ethylenic carboxylic acids of 3 to 20 carbon atoms, such as acrylic acid, methacrylic acid, itaconic acid, maleic acid, fumaric acid, crotonic acid, vinylacetic acid, allylacetic acid, vinylbenzoic acid, etc. [these acids may be in the form of salts such as alkali metal salts (e.g. sodium salts, potassium salts, etc.), ammonium salts, etc.]; ethylenic carboxylic acid esters of 4 to 20 carbon atoms, such as methyl methacrylate, ethyl methacrylate, propyl methacrylate, butyl methacrylate, 2-ethylhexyl methacrylate, stearyl methacrylate, methyl acrylate, ethyl acrylate, butyl acrylate, 2-ethylhexyl acrylate, lauryl methacrylate, stearyl acrylate, methyl itaconate, ethyl itaconate, methyl maleate, ethyl maleate, methyl fumarate, ethyl fumarate, methyl crotonate, ethyl crotonate, methyl 3-butenoate, etc.; cyano-containing vinyl compounds of 3 to 20 carbon atoms, such as acrylonitrile, methacrylonitrile, allyl cyanide, etc.; vinylic amide compounds of 3 to 20 carbon atoms, such as acrylamide, methacrylamide, etc.; ethylenic aldehydes of 3 to 20 carbon atoms, such as acrolein, crotonaldehyde, etc.; vinylsulfonic acids of 2 to 20 carbon atoms, such as vinylsulfonic acid, 4-vinylbenzenesulfonic acid, etc. [these acids may be in the form of salts such as alkali metal salts (e.g. sodium salts, potassium salts, etc.), etc.]; vinyl aliphatic amines of 2 to 20 carbon atoms, such as vinylamine, allylamine, etc.; vinyl aromatic amines of 8 to 20 carbon atoms, such as vinylaniline, etc.; vinyl aliphatic heterocyclic amines of 5 to 20 carbon atoms, such as N-vinylpyrrolidone, vinylpiperidine, etc.; vinyl aromatic heterocyclic amines of 5 to 20 carbon atoms, such as vinylpyridine, 1-vinylimidazole, etc.; ethylenic alcohols of 3 to 20 carbon atoms, such as allyl alcohol, crotyl alcohol, etc.; olefin phenols of 8 to 20 carbon atoms, such as 4-vinylphenol, etc.; and diene type compounds of 4 to 20 carbon atoms, such as butadiene, isoprene, etc.

The polymerizable monomer of the formula [6] is preferably different from the monomer used for forming the azo group-containing high-molecular weight compound of the formula [1].

In the polymerization, a solvent may be used or not used when it does not affect the polymerization. The solvent includes, for example, hydrocarbons such as toluene, xylene, benzene, cyclohexane, n-hexane, n-octane, etc.; halogenated hydrocarbons such as dichloroethane, trichloroethylene, etc.; esters such as ethyl acetate, n-butyl acetate, methyl propionate, etc.; ketones such as acetone, ethyl methyl ketone, cyclohexanone, etc.; alcohols such as methanol, ethanol, n-propanol, isopropanol, n-butanol, isobutanol, t-butanol, etc.; N-methylpyrrolidone; N,N-dimethylacetamide; N,N-dimethylformamide; and dimethyl sulfoxide. These solvents may be used singly or in proper combination.

Although the concentrations of the azo group-containing high-molecular weight compound of the present invention and the polymerizable monomer at the time of the polymerization are somewhat varied depending on the kind of the polymerizable monomer, they are properly chosen so that the total concentration of said compound and the monomer may be in the range of usually 5 to 100% by weight (no solvent), preferably 10 to 60% by weight, based on the weight of the solvent used.

In carrying out the polymerization, the molecular weight may, if necessary, be controlled by adding a chain transfer agent such as lauryl mercaptan, octyl mercaptan, butyl mercaptan, 2-mercaptoethanol, butyl thioglycolate or the like.

The inert gas includes, for example, a nitrogen gas and an argon gas.

Although not particularly limited, the polymerization temperature is properly chosen in the range of usually 20°–150° C., preferably 40°–120° C.

Although the polymerization time varies depending on the reaction conditions such as the polymerization temperature, the kinds and concentrations of the azo group-containing high-molecular weight compound and the polymerizable monomer which are to be reacted, etc., it is properly chosen in the range of usually 2 to 24 hours.

The molecular weight of the copolymer of the present invention is not particularly limited, though as the copolymer, there can be exemplified those having a number average molecular weight of usually 3,000 or more, preferably 5,000 to 2,000,000, more preferably 10,000 to 1,500,000.

The thus obtained copolymer of the present invention can have any of various block copolymer structures, depending on the kind of the αβ-ethyleniccally unsaturated monomer, and on the kind of the polymerizable monomer to be reacted with the azo group-containing high-molecular weight compound of the formula [1].

The copolymer of the present invention can be represented, for example, by the formula (in the case of MNM type);

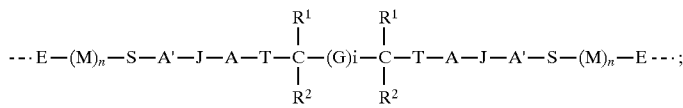

wherein G is a repeating unit derived from the polymerizable monomer of the formula [6]; i is a natural number; and A, A', $R^1$, $R^2$, T, J, M, E and n are as defined above, or by the formula (in the case of MN type);

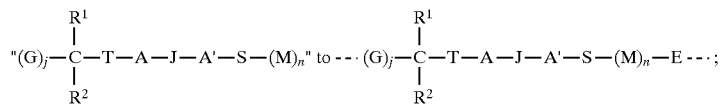

wherein j is a natural number; and G, A, A', $R^1$, $R^2$, T, J, M, E and n are as defined above, or a mixture of the formulae [7] and [8].

The copolymer of the present invention can be expected to be widely usable depending on its properties as an emulsifier, paint, wetting agent, coating agent, adhesive mass, thickening agent, base material for cosmetics, etc.

Microspheres obtained by polymerizing a polymerizable monomer by use of the azo group-containing high-molecular weight compound of the present invention can be expected to be widely usable depending on their properties as a temperature-responsive protein adsorbent, a temperature-responsive carrier for hydrophobic chromatography, a packing material for isolation and purification of sugar-bonded proteins, a latex reagent for clinical determination, etc.

The present invention is explained below in further detail with reference to Examples, which are not by way of limitation but by way of illustration, The abbreviations used in the Examples, Reference Examples and Comparative Examples described below stands for the following real names:

IPAAm: N-isopropylacrylamide,
PIPAAm: poly(N-isopropylacrylamide),
MEGlc: 2-methacryloxyethyl-D-glucopyranoside,
PMEGlc: poly(2-methacryloxyethyl-D-glucopyranoside),
AAm: acrylamide, DVB: divinylbenzene,
BMA: n-butyl methacrylate,
BA: t-butyl acrylate,
MAA: methacrylic acid,
V-501: 4,4'-azobis(4-cyanopentanoic acid), a trade name, Wako Pure Chemical Industries, Ltd.,
A-501: disuccinimidyl 4,4'-azobis(4-cyanopentanoate),
AIBN: 2,2'-azobisisobutyronitrile,
VF-077: 2,2'-azobis(2-hydroxymethylpropionitrile) (a trade name, Wako Pure Chemical Industries, Ltd.),
KPS: potassium peroxydisulfate,
MEA: β-mercaptoethylamine hydrochloride,
TEA: triethylamine,
THF: tetrahydrofuran,
DMF: N,N-dimethylformamide,
DMAP: 4-dimethylaminopyridine,
SDS: sodium dodecyl sulfate,
DCC: dicyclohexylcarbodiimide,
SL: polystyrene microsphere.
Coumarin 6: 3-(2-benzothiazolyl)-7-(diethylamino)-coumarin (a trade name, available from Sigma-Aldrich Japan)
Con A: concanavalin A

REFERENCE EXAMPLE 1

Synthesis of a Vinyl Polymer

In methanol were dissolved 19.95 g of IPAAm, 2.05 g of MEA and 0.31 g of AIBN, and the solution was subjected to polymerization under a nitrogen gas atmosphere at 70° C. for 7 hours. After completion of the reaction, the solvent was distilled off under reduced pressure and the resulting oily substance was dissolved in acetone and purified with hexane. This purifying treatment was repeated several times to obtain 5.65 g (yield: 50%) of the desired compound. The number-average molecular weight of this compound was 6,000 (degree of polymerization: 52) as measured by conductometric titration. The compound is hereinafter abbreviated as PIPAAm-NH$_2$.

REFERENCE EXAMPLE 2

Synthesis of a Vinyl Polymer

In 15 ml of a methanol-water (1:3) solution were dissolved 2.5 g of MEGlc, 56.9 mg of MEA and 34.0 mg of AIBN, and the solution was subjected to polymerization under a nitrogen gas atmosphere at 70° C. for 24 hours. After completion of the reaction, the solvent was distilled off under reduced pressure and the resulting oily substance was precipitated from acetone. This precipitation procedure was repeated and the thus obtained solids were dissolved in water and then freeze dried to obtain 2.12 g (yield: 84.7%) of the desired compound. The number-average molecular weight of this compound was 4,200 (degree of polymerization: 14) as measured by conductometric titration. The compound is hereinafter abbreviated as PMEGlc-NH$_2$.

REFERENCE EXAMPLE 3

Synthesis of a Vinyl Polymer

In methanol were dissolved 22.6 g of BMA, 2.0 g of 2-mercaptoethanol and 0.31 g of AIBN and the solution was subjected to polymerization under a nitrogen gas atmosphere at 70° C. for 7 hours. After completion of the reaction, the solvent was distilled off under reduced pressure and the resulting oily substance was dissolved in acetone and purified with hexane. This purifying treatment was repeated several times to obtain 5.65 g of the desired compound. The number-average molecular weight of this compound was 9,800 as measured by gel permeation chromatography (GPC). This compound is hereinafter abbreviated as PBMA-OH.

REFERENCE EXAMPLE 4

Synthesis of a Vinyl Polymer

In 15 ml of a methanol were dissolved 2.5 g of BA, 30.0 mg of thioglycolic acid and 34.0 mg of AIBN, and the solution was subjected to polymerization under a nitrogen gas atmosphere at 70° C. for 24 hours. After completion of the reaction, the solvent was distilled off under reduced pressure and the resulting oily substance was precipitated from acetone. This precipitation procedure was repeated to obtain 0.88 g of the desired compound. The number-average molecular weight of this compound was 27,000 as measured by GPC. This compound is hereinafter abbreviated as PBA-COOH.

EXAMPLE 1

Synthesis of an Azo Group Containing High-Molecular Weight Compound

In 30 ml of dry THF was dissolved 3.07 g of the PIPAAm-NH$_2$ obtained in Reference Example 1, followed by adding thereto 0.11 g of A-501 obtained by converting V-501 to disuccinimidyl ester by a conventional method and 0.14 ml of anhydrous TEA, and the reaction was carried out with stirring at room temperature for 2 days. After completion of the reaction, the solvent was distilled off under reduced pressure and the resulting oily substance was dissolved in water. The resulting solution was filtered and the filtrate was purified by dialysis for 3 days to obtain 2.51 g of the desired compound. Since absorptions characteristic of —CN,

—N=N—, respectively, could be confirmed from the results of IR and UV absorption spectrum analyses, the obtained compound was confirmed to be the desired azo group-containing high-molecular weight compound of the formula:

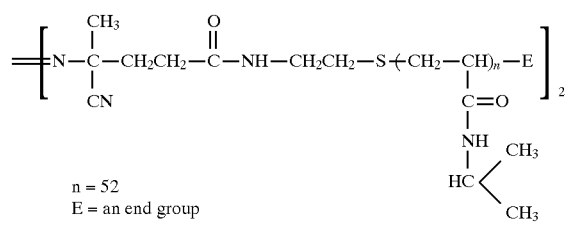

n = 52
E = an end group

The compound is hereinafter abbreviated as PIPAAm-AZO.

EXAMPLE 2

Synthesis of an Azo Group Containing High-Molecular Weight Compound

In 30 ml of dry DMF was dissolved 1.47 g of the PMEGlc-NH$_2$ obtained in Reference Example 2, followed by adding thereto 0.14 g of A-501 and 120 μl of anhydrous TEA, and the reaction was carried out with stirring in the dark at room temperature for 2 days. After completion of the reaction, the solvent was distilled off under reduced pressure and the resulting oily substance was dissolved in water. The resulting solution was filtered and the filtrate was allowed to stand in the dark for 6 days and purified by dialysis. Finally, the purified product was freeze-dried to obtain 1.17 g of the desired compound. Since absorptions characteristic of —CN and —N=N—, respectively, could be confirmed from the results of IR and UV absorption spectrum analyses and S and glucose residue could be confirmed by $^1$H-NMR, the obtained compound was confirmed to be the desired azo group-containing high-molecular weight compound represented by the formula:

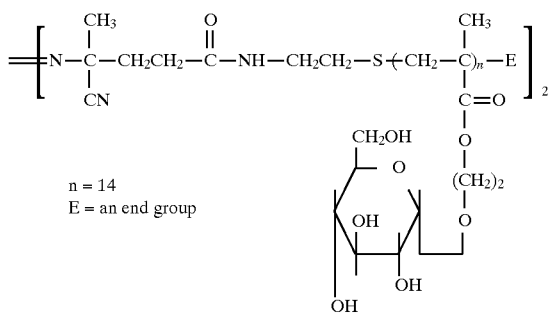

n = 14
E = an end group

The compound is hereinafter abbreviated as PMEGlc-AZO.

EXAMPLE 3

Synthesis of an Azo Group Containing High-Molecular Weight Compound

In 30 ml of THF were dissolved 0.04 g of DMAP and 0.1 g of V-501, followed by adding thereto 3.0 g of the PBMA-OH obtained in Reference Example 3 and then 0.16 g of DCC, and the reaction was carried out with stirring at room temperature for 2 days. Subsequently, the reaction mixture was diluted with 100 ml of methylene chloride and the reaction was terminated by adding water and methanol. The crystals precipitated were filtered off and the filtrate was poured into n-hexane to precipitate crystals. These crystals were collected by filtration, washed with n-hexane, and then dried to obtain 2.51 g of the desired azo group-containing high-molecular weight compound having a number-average molecular weight of about 19,900 and represented by the formula:.

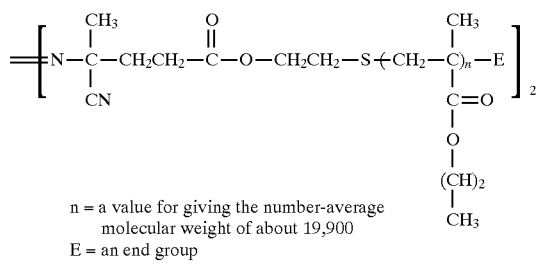

n = a value for giving the number-average
molecular weight of about 19,900
E = an end group The obtained compound was confirmed to be the desired azo group-containing high-molecular weight compound from the results of IR and UV absorption spectrum analyses.

EXAMPLE 4

Synthesis of an Azo Group-Containing High-Molecular Weight Compound

In 30 ml of THF were dissolved 0.04 g of DMAP and 78.4 mg of VF-077, followed by adding thereto 1.6 g of the PBA-COOH obtained in Reference Example 4 and then 0.16 g of DCC, and the reaction was carried out with stirring at room temperature for 2 days. After completion of the reaction, the solvent was distilled off under reduced pressure and the resulting oily substance was dissolved in water. The resulting solution was filtered and the filtrate was purified by dialysis for 3 days to obtain 1.05 g of the desired azo group-containing high-molecular weight compound having a number-average molecular weight of about 54,200 and represented by the formula:

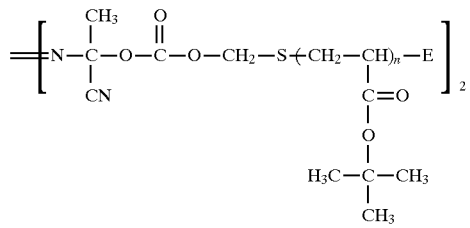

n = a value for giving the number-average
molecular weight of about 54,200
E = an end group The obtained compound was confirmed by IR and UV absorption spectrum analyses.

EXAMPLE 5

Production of a Copolymer

After mixing 2.26 g of the azo group-containing high-molecular weight compound obtained in Example 3, 10 ml of styrene and 130 ml of DMF, the mixture was subjected to polymerization under a nitrogen gas atmosphere at 70° C. for 10 hours. After completion of the reaction, the reaction mixture was poured into n-hexane to form a precipitate. The precipitate was collected by filtration, washed with n-hexane, and then dried to obtain 2.2 g of the desired copolymer. The number-average molecular weight of this compound was 33,200 as measured by GPC. From the result of $^1$H-NMR (solvent for measurement: CD$_3$OD) analysis, it was found that the weight ratio between monomer units in the copolymer was as follows; BMA : styrene=65.5 :34.5.

EXAMPLE 6

Production of a Copolymer

After mixing 0.96 g of the azo group-containing high-molecular weight compound obtained in Example 4, 6.02 g of MAA and 130 ml of DMF, the mixture was subjected to polymerization in a nitrogen stream at 70° C. for 10 hours. After completion of the reaction, the reaction mixture was poured into a large volume of methanol to form a precipitate. The precipitate was collected by filtration, washed and then dried to obtain 1.3 g of the desired copolymer. The number-average molecular weight of this copolymer was 17,600 as measured by GPC. From the result of $^1$H-NMR (solvent for measurement: CD$_3$OD) analysis, it was found that the weight ratio between monomer units in the copolymer was as follows; BA : MAA=67.5:32.5.

EXAMPLE 7

Synthesis of temperature-responsive microspheres comprising a block copolymer by use of an azo group-containing high-molecular weight compound After mixing 2.26 g of the PIPAAm-AZO obtained in Example 1, 10 ml of styrene, 0.05 ml of DVB, 1.20 g of SDS and 130 ml of water, the mixture was subjected to polymerization with vigorous stirring (200 rpm) under a nitrogen gas atmosphere at 70° C. for 10 hours. The thus obtained opaque suspension was dialyzed over a period of 10 days, followed by ultrafiltration through a membrane having a pore size of 0.1 µm, whereby a microsphere suspension with a concentration of 24.2 mg/ml (hereinafter abbreviated as PIPAAm-SL) was obtained. From the result of elementary analysis, it was confirmed that 58% of the PIPAAm-AZO used had been immobilized on the microspheres.

EXAMPLE 8

Synthesis of Lectin-Responsive Microspheres Comprising a Block Copolymer by Use of an Azo Group-Containing High-Molecular Weight Compound After mixing 1.0 g of the PMEGlc-AZO obtained in Example 2, 10 ml of styrene, 0.05 ml of DVB, 8 mg of Coumarin 6, 0.3 g of SDS and 130 ml of water, the mixture was subjected to polymerization with vigorous stirring (200 rpm) under a nitrogen gas atmosphere at 70° C. for 7 hours. The thus obtained opaque suspension was dialyzed over a period of 10 days, followed by ultrafiltration through a membrane having a pore size of 0.05 µm, whereby a microsphere suspension with a concentration of 43.1 mg/ml was obtained. From absorptions in an IR spectrum, it was confirmed that a sugar chain was present on the microsphere. The amount of PMEGlc on the microspheres was determined from the result of elementary analysis. The microsphere suspension obtained was hereinafter abbreviated as PMEGlc-SL.

COMPARATIVE EXAMPLE 1

Synthesis of Microspheres Having No PIPAAm Chain

Polymerization and after-treatment were carried out in the same manner as in Example 7 except for using V-501 as a polymerization initiator in place of PIPAAm-AZO and changing the concentration of SDS to 2 mg/ml, whereby a desired microsphere suspension with a concentration of 19.2 mg/ml was obtained. This microsphere suspension was hereinafter abbreviated as SL'.

COMPARATIVE EXAMPLE 2

Synthesis of Lectin-Responsive Microspheres Comprising a Copolymer by Use of Commercial Polymerization Initiator In a mixed solvent of 80 ml of water and 2.5 ml of methanol were dissolved 10 ml of styrene, 0.05 ml of DVB, 2.5 g of MEGlc, 50 mg of KPS and 300 mg of SDS, and the solution was subjected to polymerization with vigorous stirring (200 rpm) under a nitrogen gas atmosphere at 70° C. for 7 hours. The thus obtained opaque suspension was dialyzed over a period of 20 days, followed by ultrafiltration in the same manner as in Example 7, whereby a microsphere suspension with a concentration of 61.1 mg/ml was obtained. This microsphere suspension was hereinafter abbreviated as MEGlc-SL.

COMPARATIVE EXAMPLE 3

Synthesis of Microspheres Having No PMEGlc Chain Polymerization and after-treatment were carried out in the same manner as in Example 8 except for using V-501 as a polymerization initiator in place of PMEGlc-AZO and changing the concentration of SDS to 2 mg/ml, whereby a desired microsphere suspension with a concentration of 19.2 mg/ml was obtained. This microsphere suspension was hereinafter abbreviated as SL.

EXPERIMENT EXAMPLE 1

Onto the surface of a micro-slide glass ($\phi$=15 mm, Thickness No. 1, Matsunami, Tokyo) was poured 0.2 ml of each of the microsphere suspensions (3 mg/ml) obtained in Example 8, Comparative Example 2 and Comparative Example 3, and dried at room temperature for 3 days. On the thus obtained sample was dropped 5 µl of water and after 1 minute, the contact angle θa to water (advance contact angle) of the sample was measured by means of a contact angle measuring apparatus CA-D (mfd. by Kyowa Interface Science Co., Ltd.). The results obtained are shown in Table 1.

Next, 10 µl of water was dropped on the sample and allowed to stand for 5 minutes, after which 5 µl of the water on the sample was removed and the contact angle θr to water (receding contact angle) of the sample was measured using the remaining waterdrops. The results obtained are shown in Table 1.

In addition, the critical flocculation concentration (CFC) was measured according to a conventional method. The results obtained are also shown in Table 1.

TABLE 1

|  | Contact angle to water (°) | | Critical flocculation concentration |
| --- | --- | --- | --- |
|  | θa | θr | (CFC) |
| Example 8 | 98.1 | 47.0 | >3M |
| Comparative Example 2 | 62.4 | 25.9 | 0.32M |
| Comparative Example 3 | 24.9 | 10.2 | 0.20M |

As is clear from Table 1, although the contact angles to water of the sample obtained from the suspension of microspheres comprising the block copolymer of the present invention obtained by using the azo group-containing high-molecular weight compound of the present invention are clearly larger than those of the samples obtained from the microsphere suspensions obtained in Comparative Examples 2 wherein a random copolymer is obtained by using a known polymerization initiator, and in Comparative Example 3 wherein only a homopolymer is obtained, the critical flocculation concentration (CFC) of the microspheres comprising the block copolymer of the present invention is 10 times or more as high as those of the microspheres obtained in Comparative Examples 2 and 3. It can be seen that the stability of colloid of the microspheres comprising the copolymer of the present invention is very high.

The polymer main chains on the surfaces of block copolymer particles of the present invention in the microsphere suspension (hereinafter referred to as "the particles of the present invention") face outwards in a dry state, so that the advance contact angle (θa) is large. After contacting with water, the sugar groups in the side chain gradually contact with water to reduce the receding contact angle (θr), but the er remains still larger than those of Comparative Examples 2 and 3. This seems to be that in the particles of the present invention since the residual SDS's on the microsphere surfaces are present under the sugar chain and on the surfaces of styrene shells, there is no contact with water at the outmost surface. Further, particles showing a larger contact angle with water have generally hydrophobic surfaces, so that colloid stability seems to be provided due to stereo effect caused by radial spread of the block moieties of the block copolymer to the particle surfaces in the suspension. Thus, the particles of the present invention are characterized by showing stability not to determine the CFC, although having such a large contact angle.

The microspheres comprising the copolymer of the present invention used here can be expected to be widely usable as a latex reagent for clinical examinations, etc.

EXPERIMENT EXAMPLE 2

Using each of the microsphere suspensions obtained in Example 7 and Comparative Example 1, the critical flocculation concentration (CFC) was measured according to a conventional method. The results obtained are shown in FIG. 1.

FIG. 1 shows curves showing the critical flocculation concentration (CFC) obtained in Experiment Example 2 by plotting the critical flocculation concentration (M) on the axis of ordinate corresponding to individual measuring temperatures (°C.) on the axis of abscissa.

In FIG. 1, —○— shows a curve showing the critical flocculation concentration of the microspheres obtained in Example 7, and —●— a curve showing the critical flocculation concentration of the microspheres obtained in Comparative Example 1.

As is clear from the results shown in FIG. 1, the suspension of the microspheres comprising the copolymer of the present invention showed a CFC decrease with a temperature rise, while the microsphere suspension obtained in Comparative Example 1 did not show a CFC change with temperature. The reason can be guessed as follows: since PIPAAm-SL has a PIPAAm chain on the surface, the temperature responsivity is provided to the microsphere, so that the dispersion stability is greatly affected by the temperature.

The microspheres comprising the copolymer of the present invention used here can be expected to be widely usable as a temperature-responsive protein adsorbent, a temperature-responsive carrier for hydrophobic chromatography, etc.

EXPERIMENT EXAMPLE 3

The interaction between lectin (Con A) and each of the microsphere suspensions obtained in Example 8, Comparative Example 2 and Comparative Example 3 was observed according to a conventional method. The results obtained are shown in FIG. 2.

Figure 2:
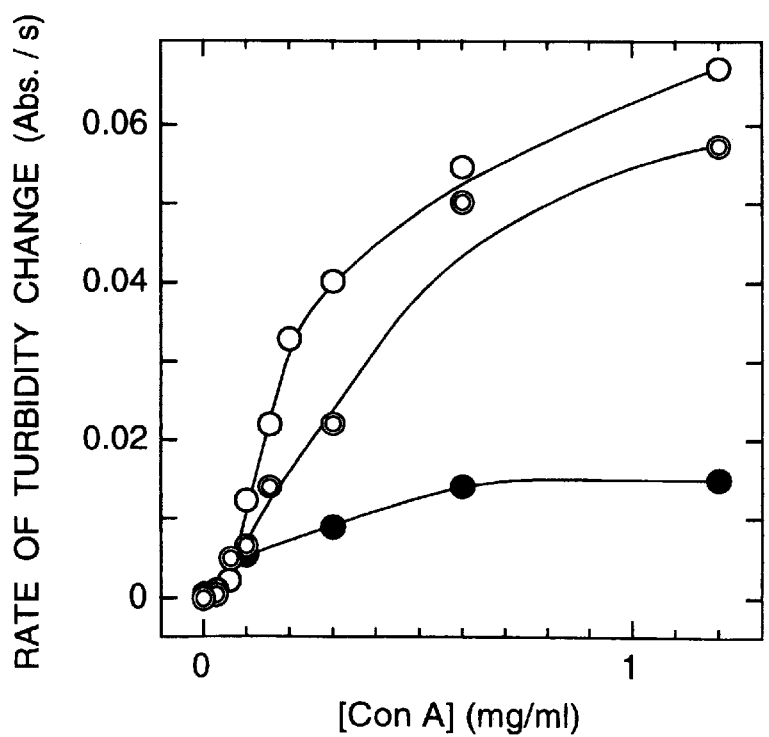
FIG. 2 shows curves showing rate of turbidity change obtained in Experiment Example 3 by plotting absorbance change (Abs./s) on the axis of ordinate corresponding to individual lectin (Con A) concentrations (mg/ml) on the axis of abscissa.

FIG. 2 shows curves showing rate of turbidity change obtained in Experiment Example 3 by plotting absorbance change (Abs./s) on the axis of ordinate corresponding to individual lectin (Con A) concentrations (mg/ml) on the axis of abscissa.

In FIG. 2, —○— shows a curve showing rate of turbidity change in the case of the microspheres obtained in Example 8, —⊙— a curve showing rate of turbidity change in the case of the microspheres obtained in Comparative Example 2, and —●— a curve showing rate of turbidity change in the case of the microspheres obtained in Comparative Example 3.

From FIG. 2, it can be seen that in the case of the microsphere suspension obtained by use of the sugar-supporting copolymer in Example 8, the rate of a turbidity change caused by the interaction between the microsphere suspension and lectin is larger than in the case of the microsphere suspensions obtained in Comparative Examples 2 and 3. The reason can be guessed as follows: since PMEGlc-SL has freer sugar residues on their surfaces, lectin could be recognized more easily.

The microspheres comprising the copolymer of the present invention used here can be expected to be widely usable as a latex reagent for clinical examinations, etc.

As described above, the present invention provides a novel azo group-containing high-molecular weight compound which makes it possible to produce by a one-step reaction a block copolymer having two or more kinds of polymer segments different in structure which can be expected to be usable for various purposes, depending on its properties; and a copolymer obtained by use of said compound. Thus, the present invention contributes greatly to the art.

What is claimed is:

1. An azo group-containing high-molecular weight compound represented by the formula:

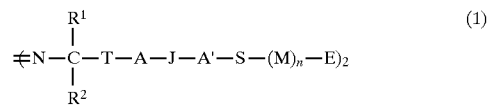

wherein one of $R^1$ and $R^2$ is a lower alkyl group while the other is a lower alkyl group or a cyano group; A is an alkylene group which may contain one or more oxygen atoms and/or an aromatic ring at the end or in the chain, or a direct link; A' is a divalent hydrocarbon group which may contain one or more oxygen atoms at the end or in the chain; M is a repeating unit derived from an α,β-ethylenically unsaturated monomer by polymerization reaction; E is an end group of the polymer obtained by polymerization of α,β-ethylenically unsaturated monomer; n is a natural number of 10 to 1,000; T is —CONH— or a direct link; and J is a direct link or an ester linkage in the case of T being —CONH—, and J is an amido linkage in the case of T being a direct link.

2. An azo group-containing high-molecular weight compound according to claim 1, wherein one of $R^1$ and $R^2$ is a methyl group while the other is a cyano group.

3. An azo group-containing high-molecular weight compound according to claim 2, wherein T is a direct link; and J is an amido linkage.

4. An azo group-containing high-molecular weight compound according to claim 1, wherein both $R^1$ and $R^2$ are methyl groups; T is —CONH—; and J is a direct link.

5. An azo group-containing high-molecular weight compound according to claim 1, wherein both $R^1$ and $R^2$ are methyl groups; T is —CONH—; and J is an ester linkage.

6. An azo group-containing high-molecular weight compound according to claim 1, wherein M is a monomer unit represented by the formula:

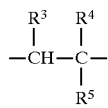  [4]

wherein $R^3$ is a hydrogen atom, a lower alkyl group, a carboxyl group, a carboxy-lower alkyl group, an alkoxycarbonyl group or a formyl group; $R^4$ is a hydrogen atom, a lower alkyl group, a carboxyl group or a halogen atom; and $R^5$ is a hydrogen atom, an alkyl group, a haloalkyl group, a substituted or unsubstituted aryl group, an aliphatic heterocyclic group, an aromatic heterocyclic group, a halogen atom, an alkoxycarbonyl group, a sugar-residue-containing alkoxycarbonyl group, a cyano group, a cyano-containing alkyl group, an acyloxy group, a carboxyl group, a carboxyalkyl group, a formyl group, an amino group, an aminoalkyl group, a carbamoyl group, an N-alkylcarbamoyl group or a hydroxyalkyl group.

7. An azo group-containing high-molecular weight compound according to claim 6, wherein $R^5$ is an alkoxycarbonyl group.

8. An azo group-containing high-molecular weight compound according to claim 6, wherein $R^5$ is a sugar-residue-containing alkoxycarbonyl group.

9. An azo group-containing high-molecular weight compound according to claim 6, wherein $R^5$ is an N-alkylcarbamoyl group.

10. A copolymer obtained by reacting an α,β-ethylenically unsaturated monomer with an azo group-containing high-molecular weight compound represented by the formula:

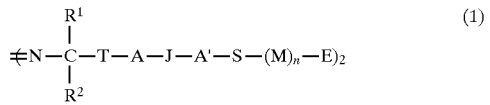 (1)

where one of $R^1$ and $R^2$ is a lower alkyl group while the other is a lower alkyl group or a cyano group; A is an alkylene group which may contain one or more oxygen atoms and/or an aromatic ring at the end or in the chain, or a direct link; A' is a divalent hydrocarbon group which may contain one or more oxygen atoms at the end or in the chain; M is a repeating unit derived from an α,β-ethylenically unsaturated monomer by polymerization reaction; E is an end group of the polymer obtained by polymerization of α,β-ethylenically unsaturated monomer; n is a natural number of 10 to 1,000; T is —CONH— or a direct link; and J is a direct link or an ester linkage in the case of T being —CONH—, and J is an amido linkage in the case of T being a direct link.

11. A copolymer according to claim 10, which is represented by the formula:

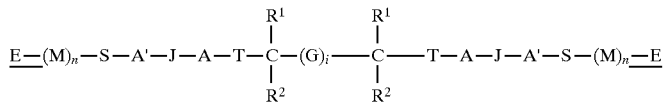 (7)

or by the formula:

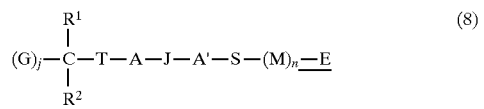 (8)

or a mixture of the formulae (7) and (8), wherein i is a natural number; j is a natural number; G is a repeating unit derived from a polymerizable monomer of the formula:

 (6)

wherein $R^6$ is a hydrogen atom, a lower alkyl group, a carboxyl group, a carboxy-lower alkyl group, an alkoxy-carbonyl group or a formyl group; $R^7$ is a hydrogen atom, a lower alkyl group, a carboxyl group or a halogen atom; and $R^8$ is a hydrogen atom, an alkyl group, a haloalkyl group, a substituted or unsubstituted aryl group, an aliphatic heterocyclic group, an aromatic heterocyclic group, a halogen atom, an alkoxycarbonyl group, a sugar-residue-containing alkoxycarbonyl group, a cyano group, a cyano-containing alkyl group, an acyloxy group, a carboxyl group, a carboxyalkyl group, a formyl group, an amino group, an aminoalkyl group, a carbamoyl group, an N-alkylcarbamoyl group or a hydroxyalkyl group; and A, A', $R^1$, $R^2$, T, J, M, E and n are as defined in claim 10.

12. A copolymer according to claim 11, wherein $R^8$ is a sugar-residue-containing alkoxycarbonyl group.

13. A polymerization initiator comprising an azo group-containing high-molecular weight compound represented by the formula:

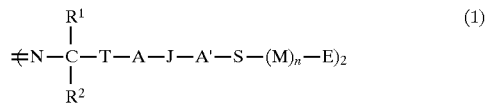 (1)

wherein one of $R^1$ and $R^2$ is a lower alkyl group while the other is a lower alkyl group or a cyano group; A is an alkylene group which may contain one or more oxygen atoms and/or an aromatic ring at the end or in the chain, or a direct link; A' is a divalent hydrocarbon group which may contain one or more oxygen atoms at the end or in the chain; M is a repeating unit derived from an α,β-ethylenically unsaturated monomer by polymerization reaction; E is an end group of the polymer obtained by polymerization of α,β-ethylenically unsaturated monomer; n is a natural number of 10 to 1,000; T is —CONH— or a direct link; and J is a direct link or an ester linkage in the case of T being —CONH—, and J is an amido linkage in the case of T being a direct link.

14. A process for producing a copolymer, which comprises: polymerizing an α,β-ethylenically unsaturated monomer with an azo group-containing high-molecular weight compound represented by the formula:

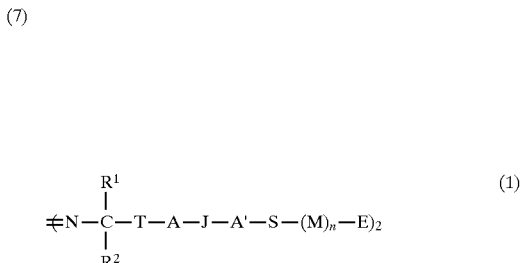 (1)

wherein one of $R^1$ and $R^2$ is a lower alkyl group while the other is a lower alkyl group or a cyano group; A is an alkylene group which may contain one or more oxygen atoms and/or an aromatic ring at the end or in the chain, or a direct link; A' is a divalent hydrocarbon group which may contain one or more oxygen atoms at the end or in the chain; M is a repeating unit derived from an α,β-ethylenically unsaturated monomer by polymerization reaction; E is an end group of the polymer obtained by polymerization of α,β-ethylenically unsaturated monomer; n is a natural number of 10 to 1,000; T is —CONH— or a direct link; and J is a direct link or an ester linkage in the case of T being —CONH—, and J is an amido linkage in the case of T being a direct link.

15. An azo group-containing high-molecular weight compound represented by the formula:

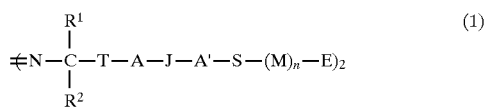
(1)

wherein one of $R^1$ and $R^2$ is a lower alkyl group while the other is a lower alkyl group or a cyano group; A is an alkylene group which may contain one or more oxygen atoms and/or an aromatic ring at the end or in the chain, or a direct link; A' is a divalent hydrocarbon group which may contain one or more oxygen atoms at the end or in the chain; M is a repeating unit derived from an α,β-ethylenically unsaturated monomer having a sugar-residue containing alkylcarbonyl group by polymerization reaction; E is an end group of the polymer obtained by polymerization of α,β-ethylenically unsaturated monomer; n is a natural number of 10 to 1,000; T is —CONH— or a direct link; and J is a direct link or an ester linkage in the case of T being —CONH—, and J is an amido linkage in the case of T being a direct link.

* * * * *